(12) United States Patent
Gupta et al.

(10) Patent No.: US 11,026,103 B2
(45) Date of Patent: Jun. 1, 2021

(54) MACHINE LEARNING DEPLOYMENT IN RADIO ACCESS NETWORKS

(71) Applicant: AT&T Intellectual Property I, L.P., Atlanta, GA (US)

(72) Inventors: Dhruv Gupta, San Ramon, CA (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

(21) Appl. No.: 16/428,671

(22) Filed: May 31, 2019

(65) Prior Publication Data

US 2020/0382968 A1 Dec. 3, 2020

(51) Int. Cl.

| | |
|---|---|
| *G06F 11/00* | (2006.01) |
| *H04W 24/02* | (2009.01) |
| *H04L 12/24* | (2006.01) |
| *H04W 28/02* | (2009.01) |
| *G06K 9/62* | (2006.01) |
| *G06N 20/00* | (2019.01) |

(52) U.S. Cl.
CPC .......... *H04W 24/02* (2013.01); *G06K 9/6231* (2013.01); *G06N 20/00* (2019.01); *H04L 41/16* (2013.01); *H04W 28/02* (2013.01)

(58) Field of Classification Search
CPC .... H04W 24/02; H04W 28/02; G06K 9/6231; H04L 41/16; G06N 20/00
USPC ........................................ 370/252, 253, 254
See application file for complete search history.

(56) References Cited

U.S. PATENT DOCUMENTS

| | | | |
|---|---|---|---|
| 2018/0109959 A1* | 4/2018 | Larsson | H04L 41/0896 |
| 2019/0378048 A1* | 12/2019 | Shrivastava | G06N 5/022 |
| 2020/0196155 A1* | 6/2020 | Bogineni | H04L 41/12 |
| 2020/0205740 A1* | 7/2020 | Laszlo | A61B 5/6803 |
| 2020/0210880 A1* | 7/2020 | Kuo | G06N 7/005 |
| 2020/0234188 A1* | 7/2020 | Maffei Vallim | G06N 20/00 |

* cited by examiner

*Primary Examiner* — Chuong T Ho
(74) *Attorney, Agent, or Firm* — Amin, Turocy & Watson, LLP

(57) ABSTRACT

The described technology is generally directed towards machine learning deployment in radio access networks. A machine learning deployment pipeline can comprise a machine learning model design platform, a network automation platform, and a radio access network. Machine learning models can be designed at the machine learning model design platform, trained at the network automation platform, and deployed and used at the radio access network. The technology includes operations performed at each stage of the deployment pipeline in order to deploy machine learning models.

20 Claims, 11 Drawing Sheets

MACHINE LEARNING DEPLOYMENT IN RADIO ACCESS NETWORKS

TECHNICAL FIELD

The subject application is related to wireless communication systems, and, for example, to control of wireless communication network traffic.

BACKGROUND

Machine learning has strong potential for improving wireless communications networks. Wireless communication networks provide mobile data and voice communications service for cellular telephones and other mobile devices. Wireless communication networks can be very large and complex, including up to thousands or even millions of different devices with different capabilities, which serve dynamically changing traffic flows that can become congested at any point. Machine learning is well suited to improving operation of such complex systems. Technologies which enable the use of machine learning functionality in wireless communication networks are therefore desired.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
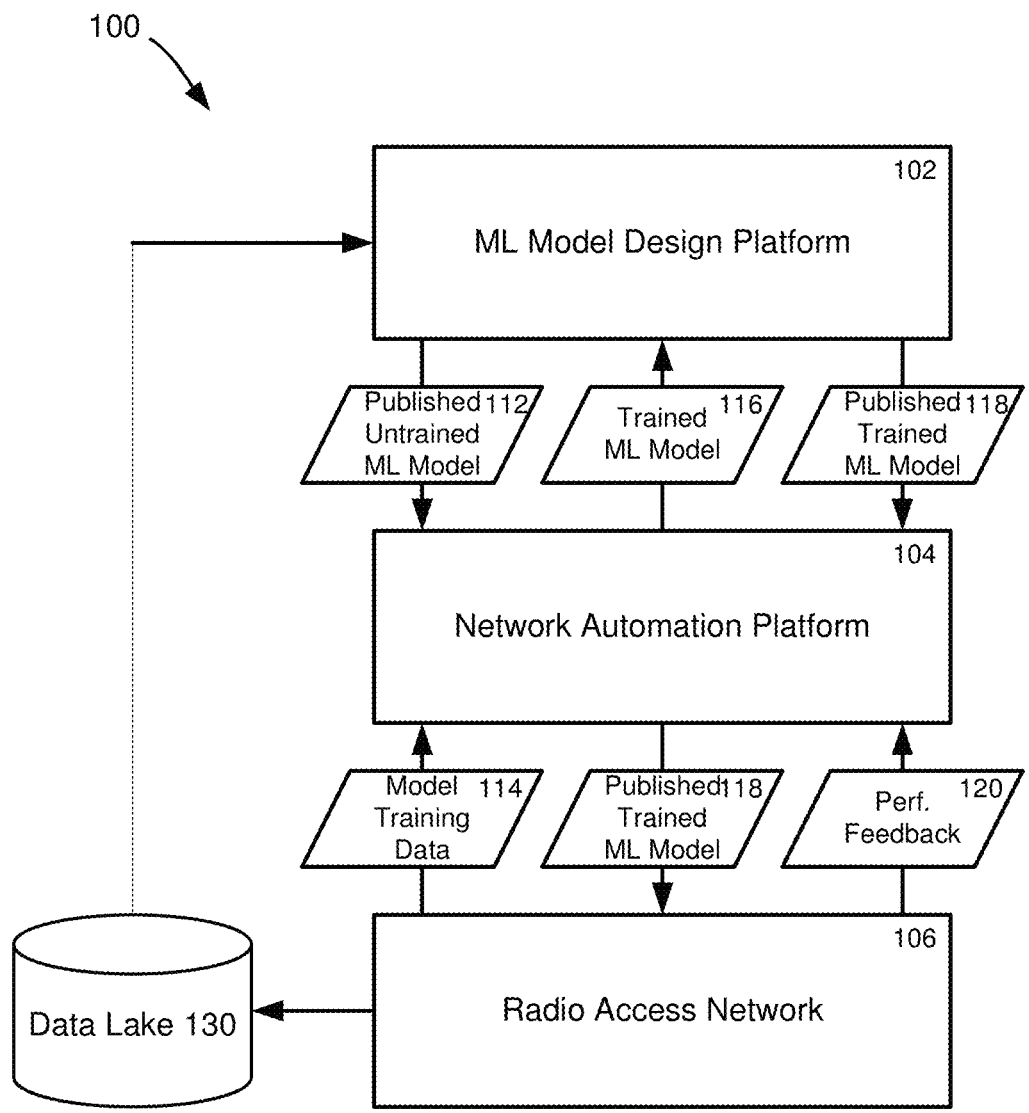
FIG. 1 is a schematic diagram illustrating an example ML model deployment pipeline comprising multiple platforms involved in design and deployment of machine learning modules in radio access networks, in accordance with various aspects and implementations of the subject disclosure.

One or more aspects of the technology described herein are generally directed towards machine learning (ML) model deployment in radio access networks. In order to efficiently design, train, and deploy ML models, the present disclosure provides a ML model deployment pipeline. ML models can initially be designed and submitted to devices of a ML model design platform. The ML model design platform can verify and publish ML models. Published ML models can be received and trained at devices of a network automation platform. The network automation platform can send trained ML models to a devices of a radio access network (RAN). The RAN can use the ML models, and the RAN can also monitor ML model performance. The RAN can provide performance feedback to the network automation platform, which can use the performance feedback to update the ML models. The RAN can furthermore contribute data to a "data lake" of data that can be used for initial ML model design.

It should be understood that any of the examples and terms used herein are non-limiting. For instance, the examples are based on 5G communications between a user equipment exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 is a schematic diagram illustrating an example ML model deployment pipeline comprising multiple platforms involved in design and deployment of machine learning modules in radio access networks, in accordance with various aspects and implementations of the subject disclosure. ML model deployment pipeline 100 includes a ML model design platform 102, a network automation platform 104, a radio access network 106, and a data lake 130.

In FIG. 1, radio access network 106 can provide network data to data lake 130. Data lake 130 can be used by ML model designers to design ML models for submission to ML model design platform 102. ML model design platform 102 can verify and publish submitted ML models. For example, ML model design platform 102 can publish the published untrained ML model 112.

Published untrained ML model 112 can be transmitted from ML model design platform 102 to network automation platform 104. Model training data 114 can be transmitted from radio access network 106 to network automation platform 104. Network automation platform 104 can use model training data 114 to train published untrained ML model 112, thereby producing trained ML model 116. Trained ML model 116 can be transmitted from network automation platform 104 to ML model design platform 102. ML model design platform 102 can verify and publish trained ML model 116, e.g., as published trained ML model 118.

Published trained ML model 118 can be transmitted from ML model design platform 102 to network automation platform 104. Published trained ML model 118 can furthermore be transmitted from network automation platform 104 to radio access network 106. Radio access network 106 can employ published trained ML model 118 for its designed purpose within radio access network 106. Radio access network 106 can monitor performance of published trained ML model 118 and collect performance feedback 120. Performance feedback 120 can be transmitted from radio access network 106 to network automation platform 104.

Network automation platform 104 can use performance feedback 120 to identify updates to published trained ML model 118. An updated ML model (not shown in FIG. 1) can optionally be transmitted from network automation platform 104 to ML model design platform 102. ML model design platform 102 can publish the updated ML model, and the updated ML model can be transmitted from ML model design platform 102 to network automation platform 104. Network automation platform 104 can transmit the updated ML model to radio access network 106. Radio access network 106 can use the updated ML model, while monitoring performance and collecting performance feedback, optionally triggering further update cycles as appropriate.

The terms "machine learning" (ML) and "artificial intelligence" (AI) are generally used interchangeably herein. ML and AI models can optionally be in the form of "microservices" (mS). Thus ML models illustrated, e.g., in FIG. 1 can comprise AI models and mS. As radio access networks such as radio access network 106 evolve to 5G, the immense complexity of the networks will benefit from advanced ML and AI based solutions to plan, manage, and optimize the radio access network 106. Consequently, it will become a priority to be able to use the best in class AI/ML solutions within the RAN elements. Aspects of this disclosure provide a ML model deployment pipeline 100 to deploy and update trained AI/ML models into RAN elements, such as RAN network controllers, of radio access network 106.

In some embodiments, ML model design platform 102 can comprise an open source ML or AI design platform such as the ACUMOS® platform made by LF Projects, LLC. The network automation platform 104 can comprise an open network automation platform (ONAP®) also made by LF Projects, LLC. Radio access network 106 can comprise a mobile communication network such as provided by AT&T Corporation or other mobile service providers. These example platforms can be modified according to this disclosure to provide the various features described herein.

In some examples, ML model deployment pipeline 100 can facilitate ML model training and deployment. For example, ML model deployment pipeline 100 can allow ML model mS to be trained offline at the network automation platform 104, e.g., in a non-real time (RT) RIC or other component of network automation platform 104. ML model mS can also be executed in near RT at, e.g., a RAN intelligent controller (RIC) of radio access network 106. Real time training of mS inside a near-RT RIC of radio access network 106 is optional. ML model parameter changes and other updates in a near-RT RIC of radio access network 106 can also be allowed at runtime. ML model training processes at network automation platform 104 can advantageously support multiple ML models with different interfaces. Topology and orchestration specification for cloud applications (TOSCA) blueprints of ML model trees at network automation platform 104 can support multiple deployment options, e.g., allowing ML models trained at network automation platform 104 to be deployed to multiple different radio access networks.

Furthermore, ML model deployment pipeline 100 can facilitate enforcement of various ML model design parameters. For example, in some embodiments, ML model deployment pipeline 100 can specify mS support for RT analytics. ML model deployment pipeline 100 preserves the ability to deploy ML models to dedicated systems, e.g., a RIC, for performance considerations, or to cloud systems, e.g., for power considerations. ML model deployment pipeline 100 can make use of specialized hardware where needed, e.g., GPUs, FPGAs, etc. In some examples, deployed ML models can run cooperatively, allowing, e.g., inferences in a near RT RIC to affect loop3 decisions.

ML model deployment pipeline 100 allows ML models to be designed and trained by application specialists, rather than, for example, data scientists. Data scientists often cannot access real training data from radio access network 106 due security issues. Data scientists also experience difficulty in adequately tagging data, due to less subject-matter knowledge. In some embodiments, data brokers can be chained with ML models to securely mine and label data.

Figure 2:
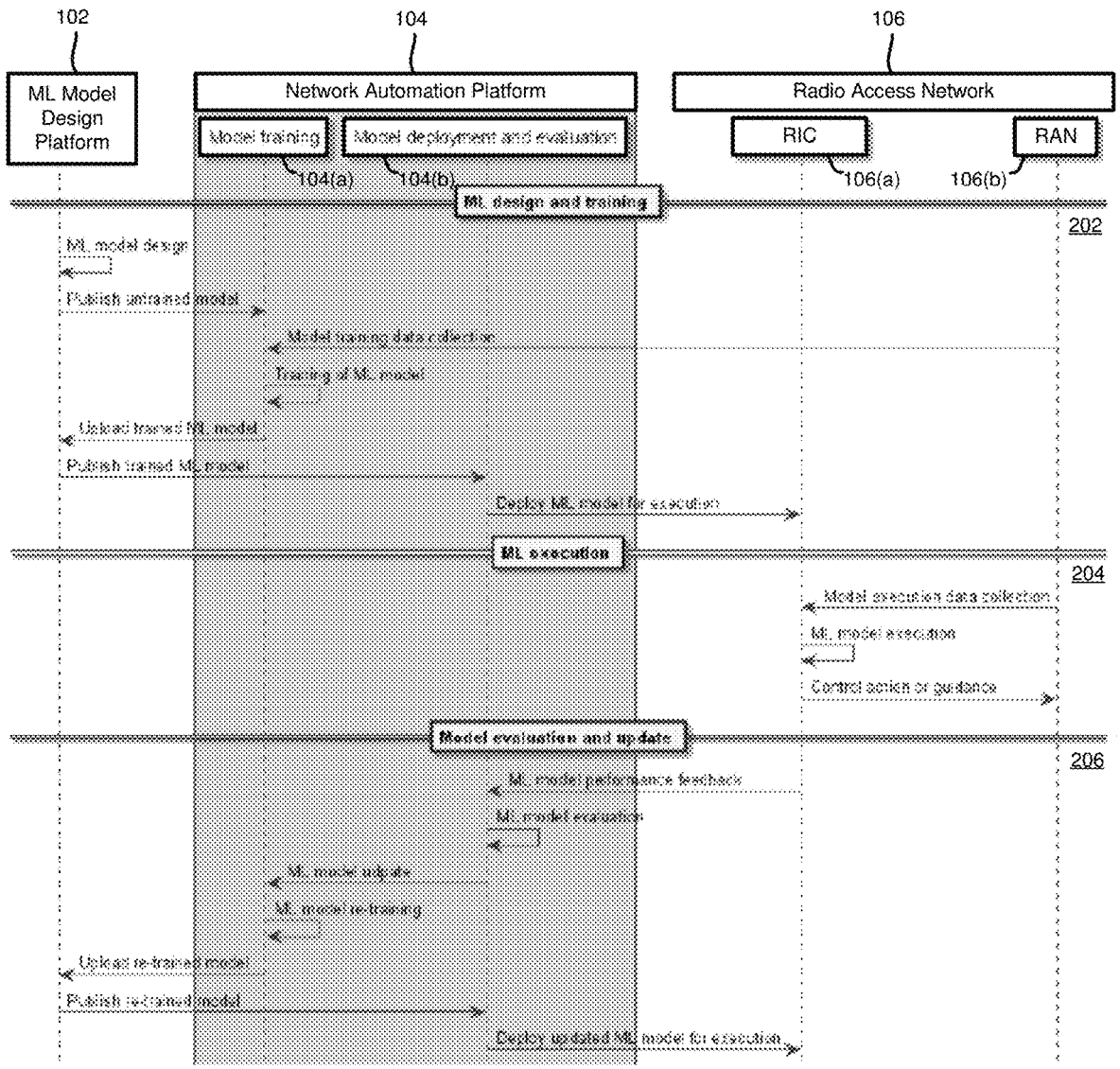
FIG. 2 is a diagram illustrating example operations of the platforms illustrated in FIG. 1, in accordance with various aspects and implementations of the subject disclosure.

FIG. 2 is a diagram illustrating example operations of the platforms illustrated in FIG. 1, in accordance with various aspects and implementations of the subject disclosure. Repetitive description of like elements employed in other embodiments described herein is omitted for sake of brevity. FIG. 2 comprises ML model design platform 102, network automation platform 104, and radio access network 106. Two components of network automation platform 104 are illustrated, namely, a model training component 104(a) and a model deployment and evaluation component 104(b). Two components of radio access network 106 are illustrated, namely, a RIC 106(a) as an example radio access network controller, and a RAN 106(b) as example other devices of the radio access network 106, such as, for example, distribution units (DUs) and other devices. FIG. 2 illustrates example operations and interactions of the various illustrated components. In general, the interactions in FIG. 2 can involve sending and receiving data from the illustrated components.

The operations of FIG. 2 are illustrated in three stages. The stages include ML design and training 202, ML execution 204, and ML evaluation and update 206. The ML design and training stage 202 includes an ML model design operation within ML model design platform 102. A publish untrained model operation is illustrated as initiated at ML model design platform 102 and terminated at model training component 104(a). A model training data collection operation is illustrated as initiated at RAN 106(b) and terminated at model training component 104(a). A training of ML model operation is illustrated within model training component 104(a). An upload trained ML model operation is illustrated as initiated at model training component 104(a) and terminated at ML model design platform 102. A publish trained ML model operation is illustrated as initiated at ML model design platform 102 and terminated at model deployment and evaluation component 104(b). A deploy ML model operation is illustrated as initiated at model deployment and evaluation component 104(b) and terminated at RIC 106(a).

The ML execution stage 204 includes a model execution data collection operation initiated at RAN 106(b) and terminated at RIC 106(a). An ML model execution operation is illustrated within RIC 106(a). A control action or guidance operation is illustrated as initiated at RIC 106(a) and terminated at RAN 106(b).

The model evaluation and update stage 206 includes an ML model performance feedback operation initiated at RIC 106(a) and terminated at model deployment and evaluation component 104(b). An ML model evaluation operation is illustrated within model deployment and evaluation component 104(b). An ML model update operation is illustrated as initiated at model deployment and evaluation component 104(b) and terminated at model training component 104(a). An ML model re-training operation is illustrated within model training component 104(a). An upload re-trained model operation is illustrated as initiated at model training component 104(a) and terminated at ML model design platform 102. A publish re-trained model operation is illustrated as initiated at ML model design platform 102 and terminated at model deployment and evaluation component 104(b). A deploy updated model for execution operation is illustrated as initiated at model deployment and evaluation component 104(b) and terminated at RIC 106(a).

Figure 3:
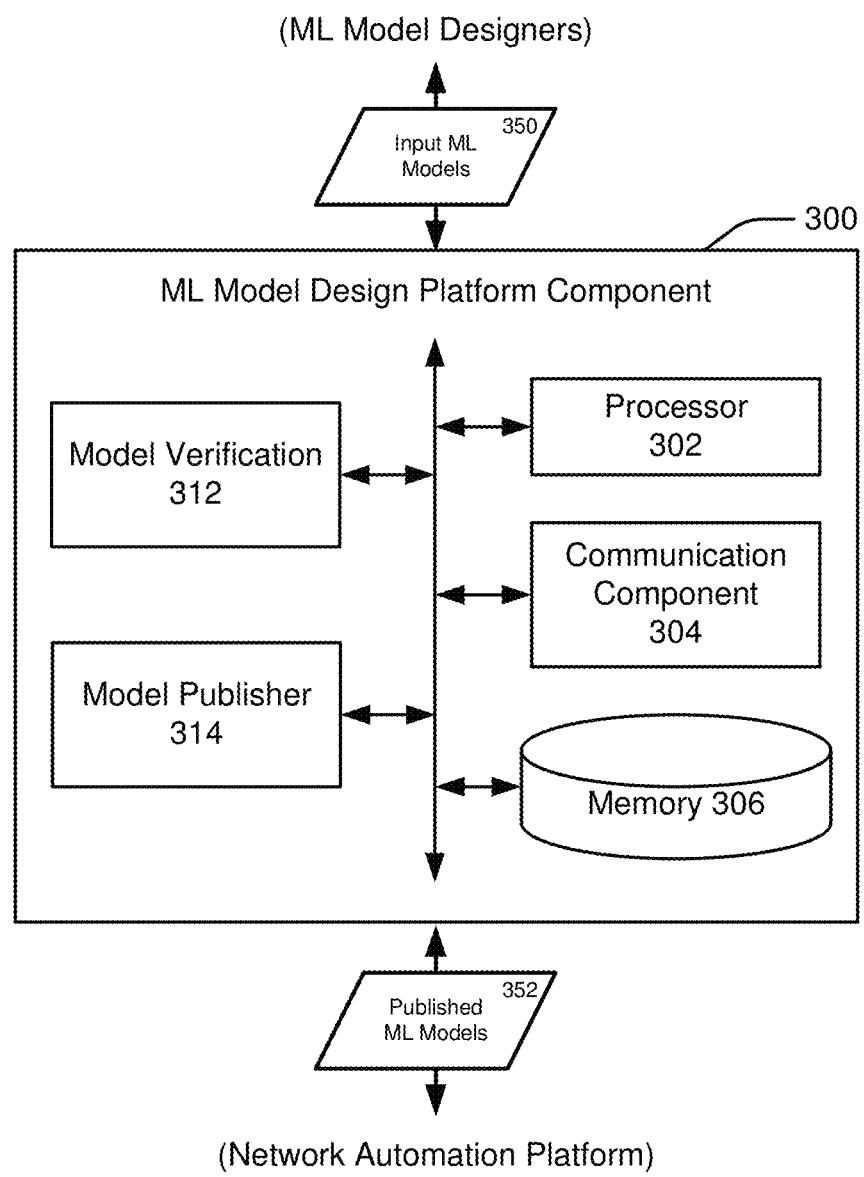
FIG. 3 is a block diagram illustrating an example machine learning model design platform component, in accordance with various aspects and implementations of the subject disclosure.

FIG. 3 is a block diagram illustrating an example machine learning model design platform component, in accordance with various aspects and implementations of the subject disclosure. Repetitive description of like elements employed in other embodiments described herein is omitted for sake of brevity. Example machine learning model design platform component 300 can comprise, e.g., a device or software component of an ML model design platform 102, illustrated in FIG. 1. Machine learning model design platform component 300 can comprise a processor 302, a communication component 304, and a memory 306 as will be appreciated.

Machine learning model design platform component 300 can also comprise a model verification component 312 and a model publisher component 314.

In FIG. 3, input ML models 350 can be received at machine learning model design platform component 300. Initially, input ML models 350 can be received from, e.g., ML model designers. Subsequently, input ML models 350 can be received from, e.g., network automation platform 104, as network automation platform 104 returns trained and/or updated models to ML model design platform 102. Model verification component 312 can scan input ML models 350 for their compliance with any of a wide variety model requirements. For example, model verification component 312 can scan for security violations, known bugs, operational requirements, or any other requirements as may be desired for particular implementations. In response to a verification failure, model verification component 312 can return an error to the ML model designer or other submitter of an input ML model 350. In response to a verification pass, model verification component 312 can notify model publisher component 314.

Model publisher component 314 can publish ML models, e.g., as published ML models 352. In some embodiments, model publisher component 314 can publish ML models 352 by sending published ML models 352 to a network automation platform. For example, a network automation platform can provide an Application Programming Interface (API) which supports passing published ML models 352 from model design platform component 300 to the network automation platform. In other embodiments, model publisher component 314 can, e.g., make the published ML models 352 available for retrieval by network automation platform or others, in response to a request through an Application Programming Interface (API) implemented at model design platform component 300. In some embodiments, model publisher component 314 can publish ML models along with tracking information, e.g., linking a published ML model 352 with an input ML model 350. Tracking information can be used, e.g., by the network automation platform, to identify a published ML model 352 corresponding to an ML model trained at the network automation platform.

Figure 4:
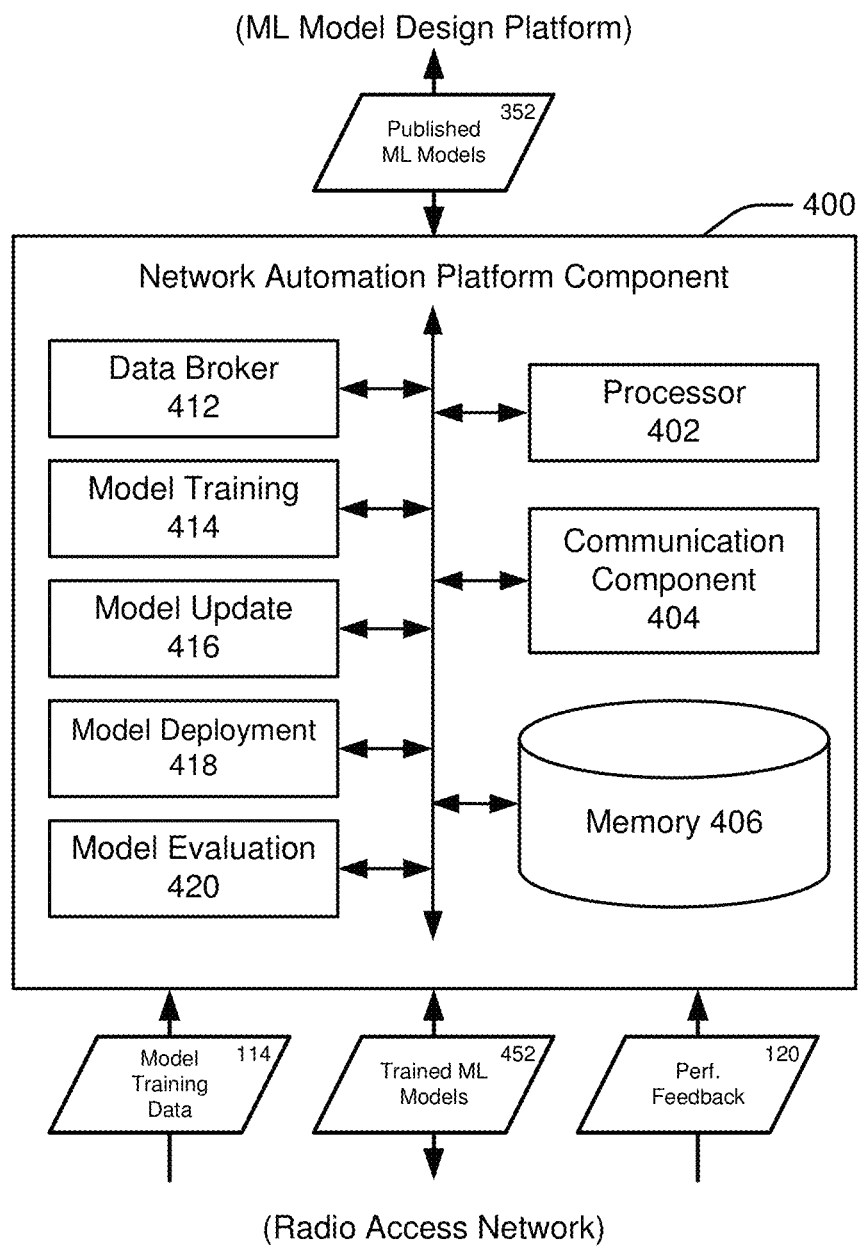
FIG. 4 is a block diagram illustrating an example network automation platform component, in accordance with various aspects and implementations of the subject disclosure.

FIG. 4 is a block diagram illustrating an example network automation platform component, in accordance with various aspects and implementations of the subject disclosure. Repetitive description of like elements employed in other embodiments described herein is omitted for sake of brevity. Example network automation platform component 400 can comprise, e.g., a device or software component of a network automation platform 104, illustrated in FIG. 1. Network automation platform component 400 can comprise a processor 402, a communication component 404, and a memory 406 as will be appreciated. Network automation platform component 400 can also comprise, e.g., a data broker component 412, a model training component 414, a model update component 416, a model deployment component 418, and a model evaluation component 420. In some embodiments, the data broker component 412 and the model training component 414 can be included in model training component 104(a) illustrated in FIG. 2, and model update component 416, model deployment component 418, and model evaluation component 420 can be included in model deployment and evaluation component 104(b) illustrated in FIG. 2.

In FIG. 4, model training data 114 can be received at network automation platform component 400 from a radio access network 106. In some embodiments, network automation platform component 400 can provide an API accessible by radio access network 106, through which radio access network 106 can provide model training data 114 to network automation platform component 400. In some embodiments, network automation platform component 400 can access an API provided by radio access network 106, such as the A1 interface 522 illustrated in FIG. 5, to retrieve model training data 114. In some embodiments, network automation platform component 400 can determine from a received ML model or accompanying data, training data for the received ML model and network automation platform component 400 can then retrieve the determined training data from the radio access network 106.

In another aspect, published ML models 352 can be received at network automation platform component 400. Published ML models 352 can be received, e.g., from an ML model design platform component 300 such as illustrated in FIG. 3. Published ML models 352 can comprise untrained, trained, and/or updated ML models as will be understood by reference to FIG. 2.

In some embodiments, data broker component 412 can optionally determine model training data for a received published ML model 352, request model training data for the received published ML model 352, e.g., from a radio access network, receive the model training data 114, and/or organize the received model training data 114 for use in training the received published ML model 352.

Model training component 414 can train received published ML model 352 using the received model training data 114. Model training component 414 can for example run received published ML model 352, while directing received published ML model 352 to process the received model training data 114. In some embodiments, model training component 414 can furthermore provide a virtualized environment allowing received published ML model 352 to behave as if it was operating in a RAN. For example, if received published ML model 352 is configured to control a particular RAN component, model training component 414 can virtualize a command interface for the RAN component, so that received published ML model 352 can control the virtualized command interface without errors.

In some embodiments, model training component 414 can furthermore include a decision setting to use in determining when received published ML model 352 is sufficiently trained for deployment. For example, sufficient training can be determined after an amount of training time is elapsed, or after a defined number of training cycles.

In another aspect, model training component 414 can send a trained, published ML model to an ML model design platform. The ML model design platform can perform model verification of the trained ML model, and can publish the trained ML model to thereby provide a trained, published ML model as an input model 350 to network automation platform component 400.

Model deployment component 418 can deploy trained ML models 452 to a RAN, e.g., after the model training component 414 has determined training is complete, and optionally received a re-published, trained ML model from the ML design platform. In some embodiments, model deployment component 418 can access a RAN interface, such as the A1 interface illustrated in FIG. 5, in order to pass a trained ML model 452 to the RAN. Model deployment component 418 can pass the trained ML model 452 and any accompanying settings, parameters, or metadata which accompanies the trained ML model 452. In some embodiments, e.g., where model deployment component 418 is operable with multiple different RANs, model deployment component 418 can determine a target RAN for trained ML model 452, and model deployment component 418 can pass the trained ML model 452 to the determined target RAN.

Figure 5:
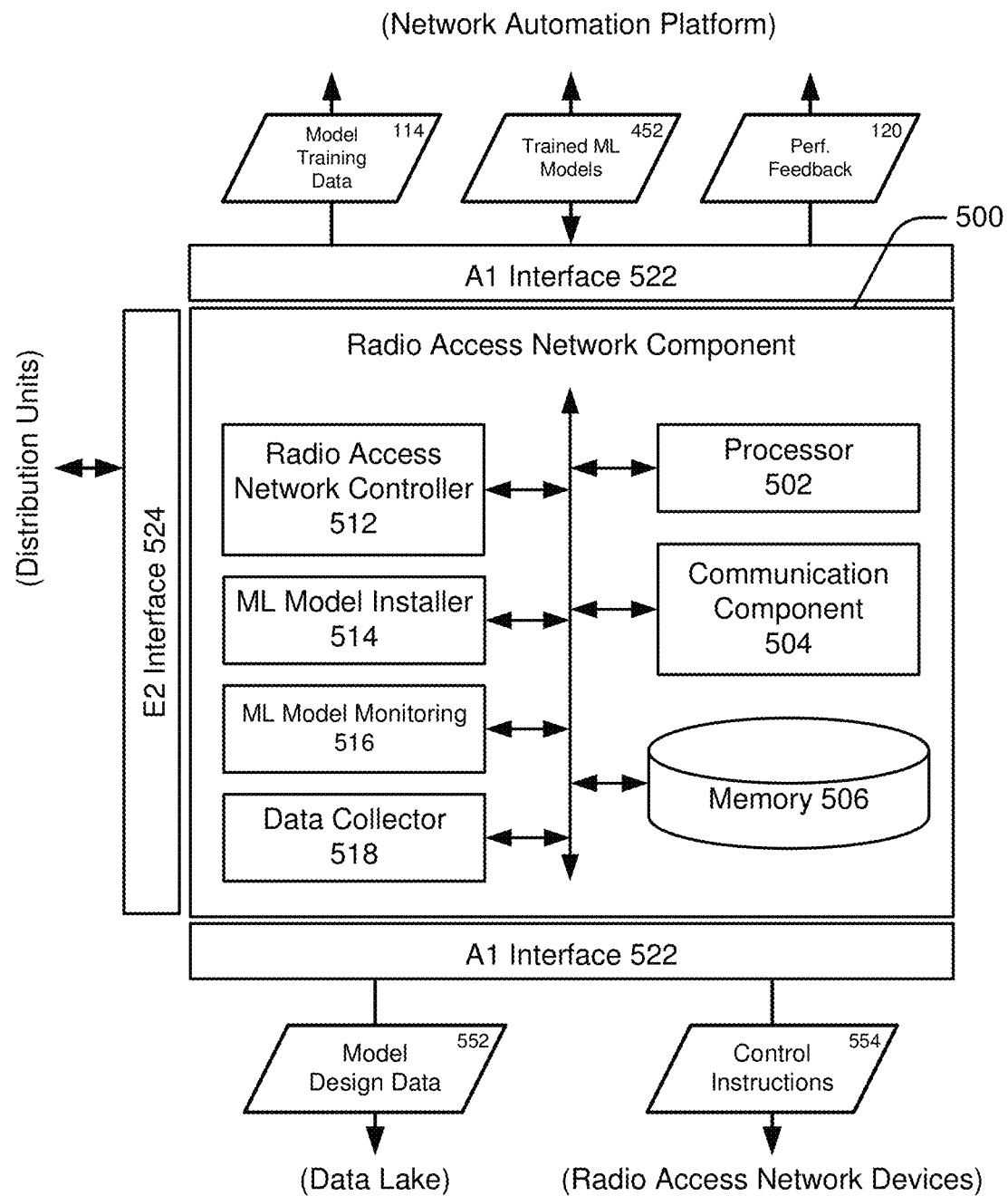
FIG. 5 is a block diagram illustrating an example radio access network component, in accordance with various aspects and implementations of the subject disclosure.

In another aspect, performance feedback 120 can be received at network automation platform component 400. Performance feedback 120 can be received, e.g., from a RAN component 500 such as illustrated in FIG. 5. A radio access network can for example run the trained ML model 452, while collecting performance feedback data. The radio access network can then send performance feedback 120 to network automation platform component 400. In some embodiments, performance feedback 120 can for example identify underperforming or non-performing aspects of the trained ML model 452.

Model evaluation component 418 can evaluate performance feedback 120 in order to identify whether a previously deployed ML model, such as trained ML model 452, should be updated. In some cases, model evaluation component 418 can determine that no update is needed. In other embodiments, model evaluation component 418 can determine that one or more updates are desired, and model evaluation component 418 can flag portions of, e.g., trained ML model 452 for update. An update can include, for example, a replacement or a removal of a portion of trained ML model 452.

Model update component 418 can optionally perform updates of trained ML model 452 pursuant to evaluation determinations made at model evaluation component 418. Model update component 418 can, for example, remove, modify, or replace portions of trained ML model 452. Model update component 418 can optionally return an updated ML model to ML model design platform, and network automation platform component 400 can subsequently receive a re-published version of the updated ML model as another published ML model 352. Model deployment component 418 can optionally provide the published, updated ML model to the radio access network, e.g. as one of trained ML models 452.

FIG. 5 is a block diagram illustrating an example radio access network component, in accordance with various aspects and implementations of the subject disclosure. Repetitive description of like elements employed in other embodiments described herein is omitted for sake of brevity. Example radio access network component 500 can comprise, e.g., a device or software component of a radio access network 106, illustrated in FIG. 1. Radio access network component 500 can comprise a processor 502, a communication component 504, and a memory 506 as will be appreciated. Radio access network component 500 can also comprise, e.g., a radio access network controller 512, an ML model installer component 514, an ML model monitoring component 516, and a data collector component 518. In some embodiments, the radio access network controller 512 can comprise a RIC 106(a) illustrated in FIG. 2, and ML model installer component 514, the ML model monitoring component 516, and the data collector component 518 can be included in the radio access network controller 512.

In some embodiments, radio access network component 500 can provide interfaces, e.g., an A1 interface 522 and an E2 interface 524. The E2 interface 524 can facilitate interaction with other RAN elements, e.g., distribution units (DUs). The A1 interface can facilitate interaction with, e.g., a data lake, a network automation platform, and optionally, other RAN devices.

In an example definition of the A1 interface, the A1 interface can include both a policy/intent portion for RIC control, and a RAN fault, configuration, accounting, performance, security (RANFCAPS) portion. The A1 interface can include infrastructure management, policy, and software orchestration portions. The configuration portion of the A1 interface can allow, inter alia, specific parameter-based changes, such as for example, "set transmit power to X.". Some configurations can be driven out of a RIC, and such changes can be delegated by a network automation platform to avoid conflicts. AI/ML model configurations can comprise model parameter changes or model software updates. Policies set via the A1 interface can be interpretive in nature, and can specify guidance for underlying systems, within the constraints of an applied configuration. For example, a policy can prioritize coverage over energy efficiency. Intent based policies can also be set.

Data collector component 518 can optionally collect RAN data for use in ML model design and training. ML model design data 552 can be collected, stored, and provided to a data lake for use in ML model design. ML model design data 552 can include, e.g., any data collected or generated by a RAN. Model training data 114 can also be collected, e.g., in response to training data requests from a network automation platform. Otherwise, model training data 114 can include defined model training data categories. Data collector 518 can send model training data 114 to a network automation platform for use in training ML models.

Trained ML models 452 can be received at radio access network component 500 from a network automation platform. A received trained ML model 452 can be installed, e.g., by ML model installer 514, to execute within the radio access network controller 512, or optionally, to execute within another radio access network device. ML model installer 514 can provide a trained ML model 452 with authorization to access the various data types and/or RAN devices and authorization or other information to control RAN devices or otherwise generate outputs according to the intended design of trained ML model 452. As it executes, the trained ML model 452 can generate control instruction 554, e.g., for radio access network devices.

ML model monitoring component 516 can optionally collect performance data based on operation of trained ML model 452 within the radio access network component 500. For example, ML model monitoring component 516 can collect information regarding errors or anomalies in the execution of trained ML model 452, as well as, e.g., efficiency information pertaining to RAN devices controlled by the control instructions 554. ML model monitoring component 516 can send collected performance feedback 120 to a network automation platform, so that the network automation platform can evaluate and optionally update the trained ML model 452. In some embodiments, ML model monitoring component 516 can return the trained ML model 452, as subsequently further trained due to execution within the RAN, to the network automation platform so that the network automation platform can update the further trained ML model 452.

Figure 6:
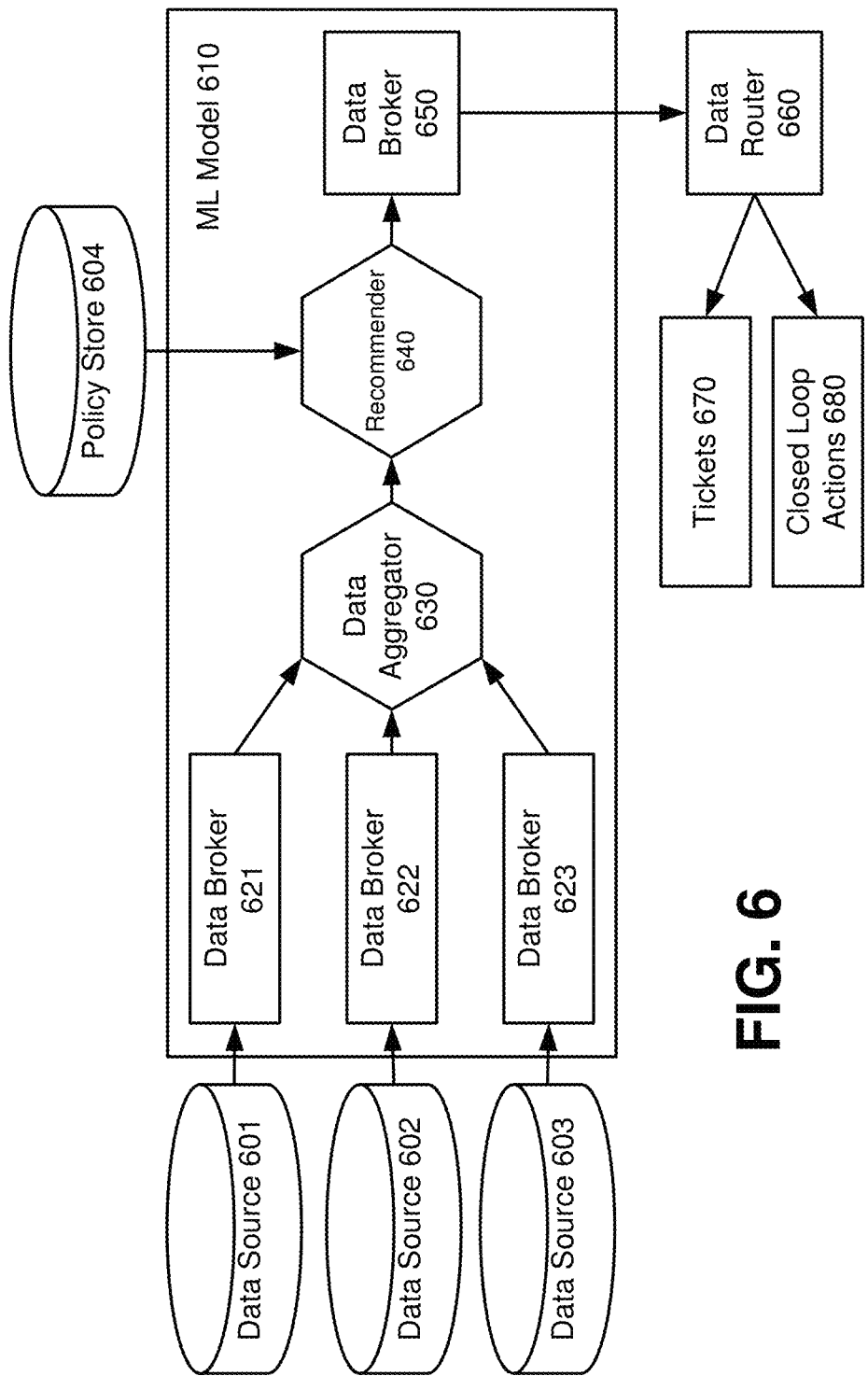
FIG. 6 is a block diagram illustrating an example machine learning model, in accordance with various aspects and implementations of the subject disclosure.

FIG. 6 is a block diagram illustrating an example machine learning model, in accordance with various aspects and implementations of the subject disclosure. Repetitive description of like elements employed in other embodiments described herein is omitted for sake of brevity. FIG. 6 comprises an ML model 610, data sources 601, 602, and 603, policy store 604, data router 660, tickets 670 and closed loop actions 680. ML model 610 includes data brokers 621, 622, and 623, data aggregator 630, recommender 640, and data broker 650.

ML models such as ML model 610 can serve a wide variety functions, and this disclosure is intended to work with various different ML models, and as such is not limited to any particular ML model function. Some example ML models can for example, perform network traffic steering to offload traffic from congested cells. Other ML models can provide bandwidth predictions on various communication channels, to facilitate channel switching as needed to avoid video stalls or other service disruptions. Still further ML models can provide load balancing of network processing tasks. A wide variety of other ML models are contemplated.

In general, ML model 610 can use data brokers 621, 622, and 623 to monitor one or more data sources 601, 602, and 603. Data sources 601, 602, and 603 can include any data sources. Some examples include network data, logs, and routers. Data aggregator 630 can collect, aggregate and correlate data monitored by data brokers 621, 622, and 623. Recommender 640 can select, based on aggregated data from data aggregator 630, an appropriate policy for ML model 610 from policy store 610. If necessary, recommender 640 output can be processed by an output data broker 650. ML model 610 outputs can be sent to a data router 660 for routing to appropriate network devices. In some cases, ML model 610 outputs can comprise closed loop actions 680, e.g., control instructions which can be carried out by a network device. In other cases, ML model 610 outputs can comprise tickets 670, such as recommended actions or network analysis information for further processing.

Figure 7:
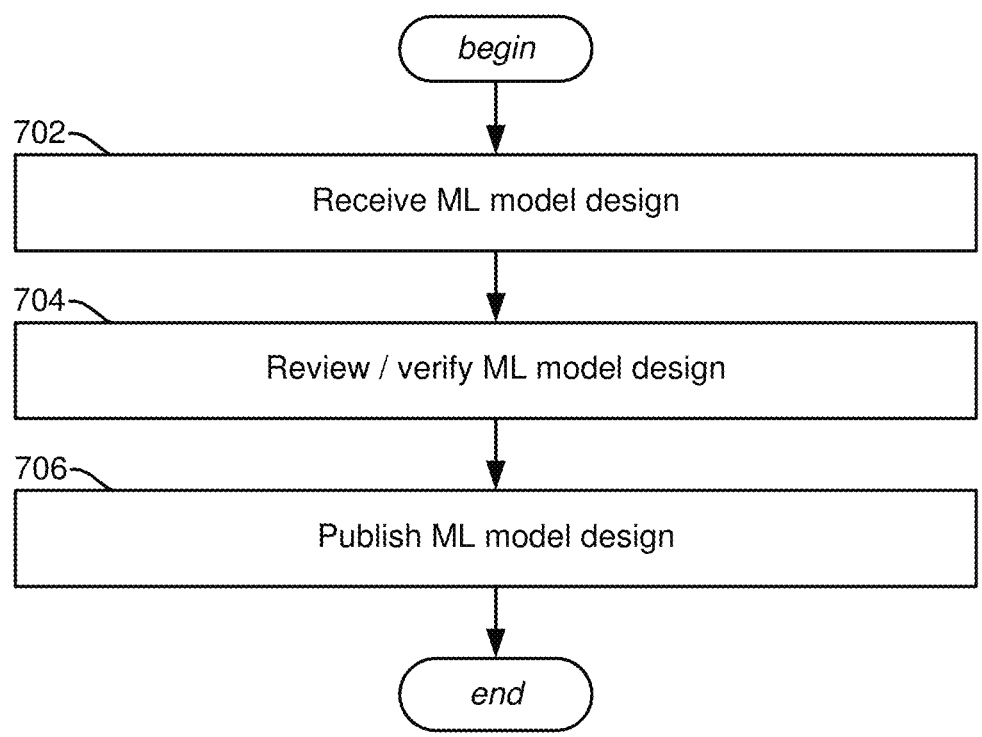
FIG. 7 is a flow diagram representing example operations of machine learning model design platform component, in accordance with various aspects and implementations of the subject disclosure.

One or more aspects, such as implemented in a machine-readable storage medium, comprising executable instructions that, when executed by a processor, facilitate performance of operations, are represented in FIG. 7. FIG. 7 is a flow diagram representing example operations of machine learning model design platform component, in accordance with various aspects and implementations of the subject disclosure. Repetitive description of like elements employed in other embodiments described herein is omitted for sake of brevity.

Example operations comprise operation 702, which represents receiving an ML model design. For example, with reference to FIG. 3, an input ML model of input ML models 350 can be received at ML model design platform component 300. Operation 704 represents reviewing and verifying an ML model design. For example, with reference to FIG. 3, the received input ML model of input ML models 350 can be reviewed and verified by model verification component 312. Operation 706 represents publishing an ML model. For example, with reference to FIG. 3, a reviewed and verified ML model can be published by model publisher component 314.

Figure 8:
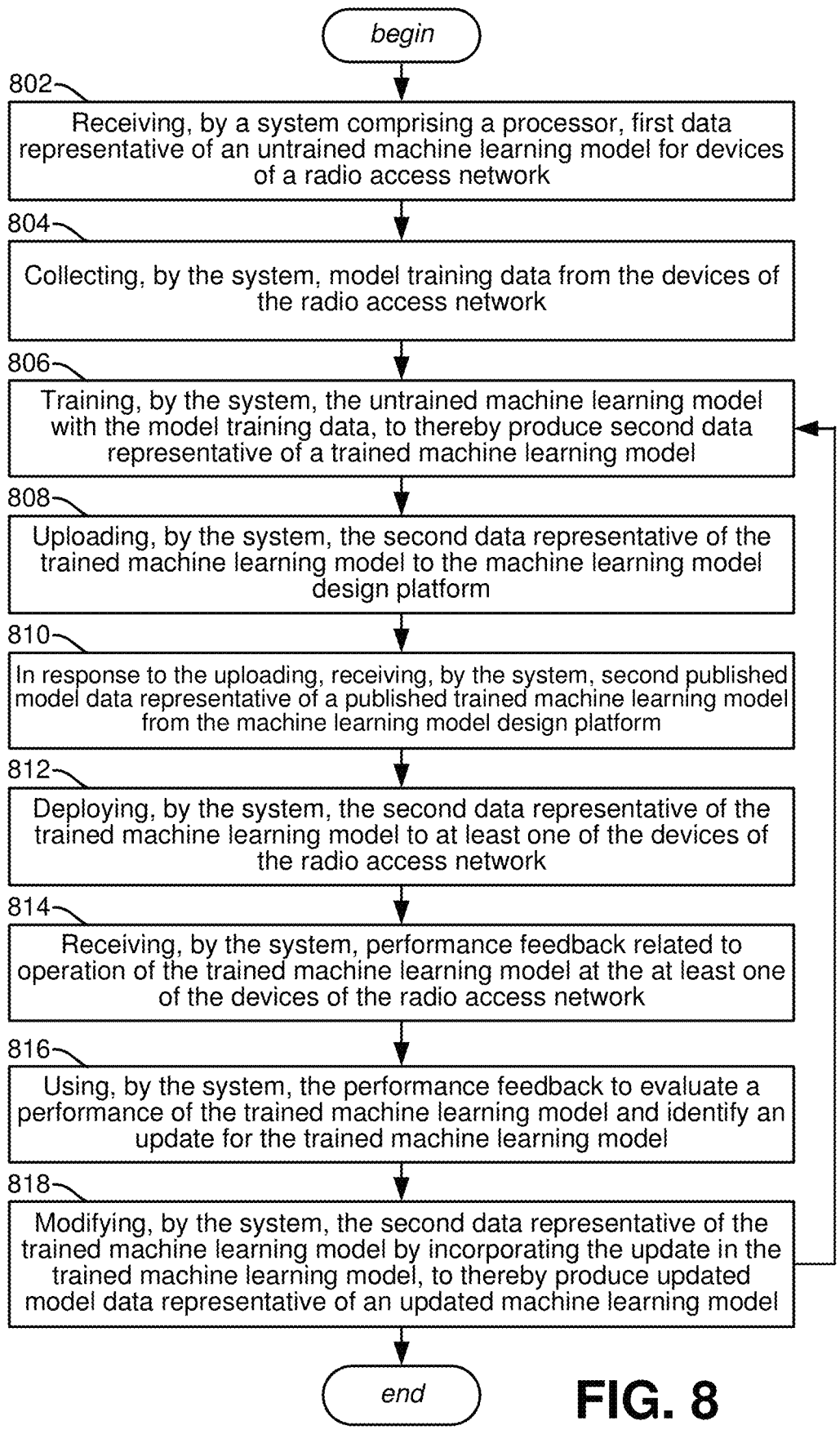
FIG. 8 is a flow diagram representing example operations of a network automation platform component, in accordance with various aspects and implementations of the subject disclosure.

One or more aspects, such as implemented in a machine-readable storage medium, comprising executable instructions that, when executed by a processor, facilitate performance of operations, are represented in FIG. 8. FIG. 8 is a flow diagram representing example operations of a network automation platform component, in accordance with various aspects and implementations of the subject disclosure. Repetitive description of like elements employed in other embodiments described herein is omitted for sake of brevity.

Example operations comprise operation 802, which represents receiving, by a system comprising a processor, first data representative of an untrained machine learning model for devices of a radio access network. For example, with reference to FIG. 4, a published ML model of published ML models 352 can be received at network automation platform component 400. Operation 804 represents collecting, by the system, model training data from the devices of the radio access network. For example, with reference to FIG. 4, model training data 114 can be collected by the network automation platform component 400.

Operation 806 represents training, by the system, the untrained machine learning model with the model training data, to thereby produce second data representative of a trained machine learning model. For example, with reference to FIG. 4, model training component 414 can train the untrained ML model received at operation 802, using the model training data 114.

Operation 808 represents uploading, by the system, the second data representative of the trained machine learning model to the machine learning model design platform. For example, with reference to FIG. 4, the ML model trained at block 806 can be returned by the network automation platform component 400 to the ML model design platform for re-verification and republishing. Operation 810 represents, in response to the uploading at block 808, receiving, by the system, second published model data representative of a published trained machine learning model from the machine learning model design platform. For example, with reference to FIG. 4, after the ML model trained at block 806 and uploaded at block 808 can be republished by the ML model design platform and received back at network automation platform component 400, e.g., as another of published ML models 352.

Operation 812 represents deploying, by the system, the second data representative of the trained machine learning model to at least one of the devices of the radio access network. For example, with reference to FIG. 4, The ML model received at block 810 can be deployed as a trained ML model of trained ML models 452 to a device of a radio access network.

Operation 814 represents receiving, by the system, performance feedback related to operation of the trained machine learning model at the at least one of the devices of the radio access network. For example, with reference to FIG. 4, the ML model deployed at operation 812 can be used and monitored at the radio access network, and the radio access network can return performance feedback 120 to the network automation platform component 400, which thereby receives the performance feedback 120.

Operation 816 represents using, by the system, the performance feedback to evaluate a performance of the trained machine learning model and identify an update for the trained machine learning model. For example, with reference to FIG. 4, model evaluation component 420 can use performance feedback 120 to evaluate performance of the ML model deployed at operation 812, and model evaluation component 420 can identify an update for the ML model deployed at operation 812. Operation 818 represents modifying, by the system, the second data representative of the trained machine learning model by incorporating the update in the trained machine learning model, to thereby produce updated model data representative of an updated machine learning model. For example, with reference to FIG. 4, model update component 416 can incorporate the update identified at operation 816, in the ML model deployed at operation 812, to thereby produce an updated machine learning model. FIG. 8 illustrates an optional return from block 818 to block 806, in order to indicate that the updated ML model can optionally be retrained, returned to the ML model design platform, re-published, and re-deployed to the RAN.

Figure 9:
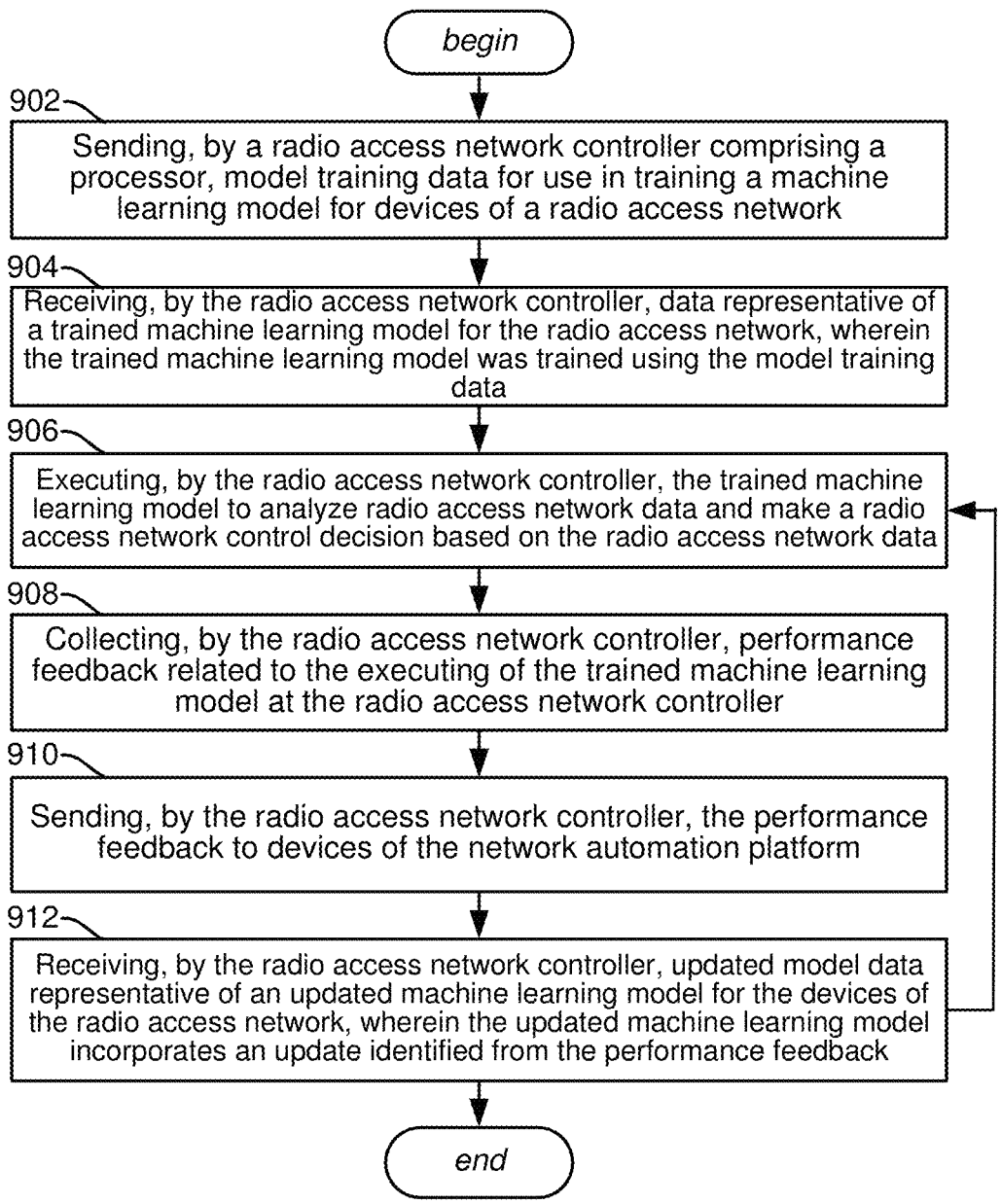
FIG. 9 is a flow diagram representing example operations of a radio access network component, in accordance with various aspects and implementations of the subject disclosure.

One or more aspects, such as implemented in a machine-readable storage medium, comprising executable instructions that, when executed by a processor, facilitate performance of operations, are represented in FIG. 9. FIG. 9 is a flow diagram representing example operations of a radio access network component, in accordance with various aspects and implementations of the subject disclosure. Repetitive description of like elements employed in other embodiments described herein is omitted for sake of brevity.

Example operations comprise operation 902, which represents sending, by a radio access network controller comprising a processor, model training data for use in training a machine learning model for devices of a radio access network. For example, with reference to FIG. 5, radio access network controller 512 can send model training data 114 to a network automation platform for use in training a machine learning model for devices of a radio access network comprising radio access network component 500.

Operation 904 represents receiving, by the radio access network controller, data representative of a trained machine learning model for the radio access network, wherein the trained machine learning model was trained using the model training data. For example, with reference to FIG. 5, radio access network controller 512 can receive a trained ML model of trained ML models 452. The received trained ML model can have been trained using the model training data 114.

Operation 906 represents executing, by the radio access network controller, the trained machine learning model to analyze radio access network data and make a radio access network control decision based on the radio access network data. For example, with reference to FIG. 5, radio access network controller 512 can execute the trained ML model received at operation 904. The trained ML model can analyze radio access network data as can be stored in memory 506 or at other RAN devices, and the trained ML model can generate control instructions 554 comprising radio access network control decisions based on the analyzed radio access network data.

Operation 908 represents collecting, by the radio access network controller, performance feedback related to the executing of the trained machine learning model at the radio access network controller. For example, with reference to FIG. 5, radio access network controller 512 can employ ML model monitoring 516 to collect performance feedback. Operation 910 represents sending, by the radio access network controller 512, the performance feedback 120 to devices of the network automation platform.

Operation 912 represents receiving, by the radio access network controller, updated model data representative of an updated machine learning model for the devices of the radio access network, wherein the updated machine learning model incorporates an update identified from the performance feedback. For example, with reference to FIG. 5, radio access network controller 512 can receive an updated ML model of trained ML models 452. The updated ML model can incorporate an update made by the network automation platform, which update can be identified from the performance feedback 120.

Figure 10:
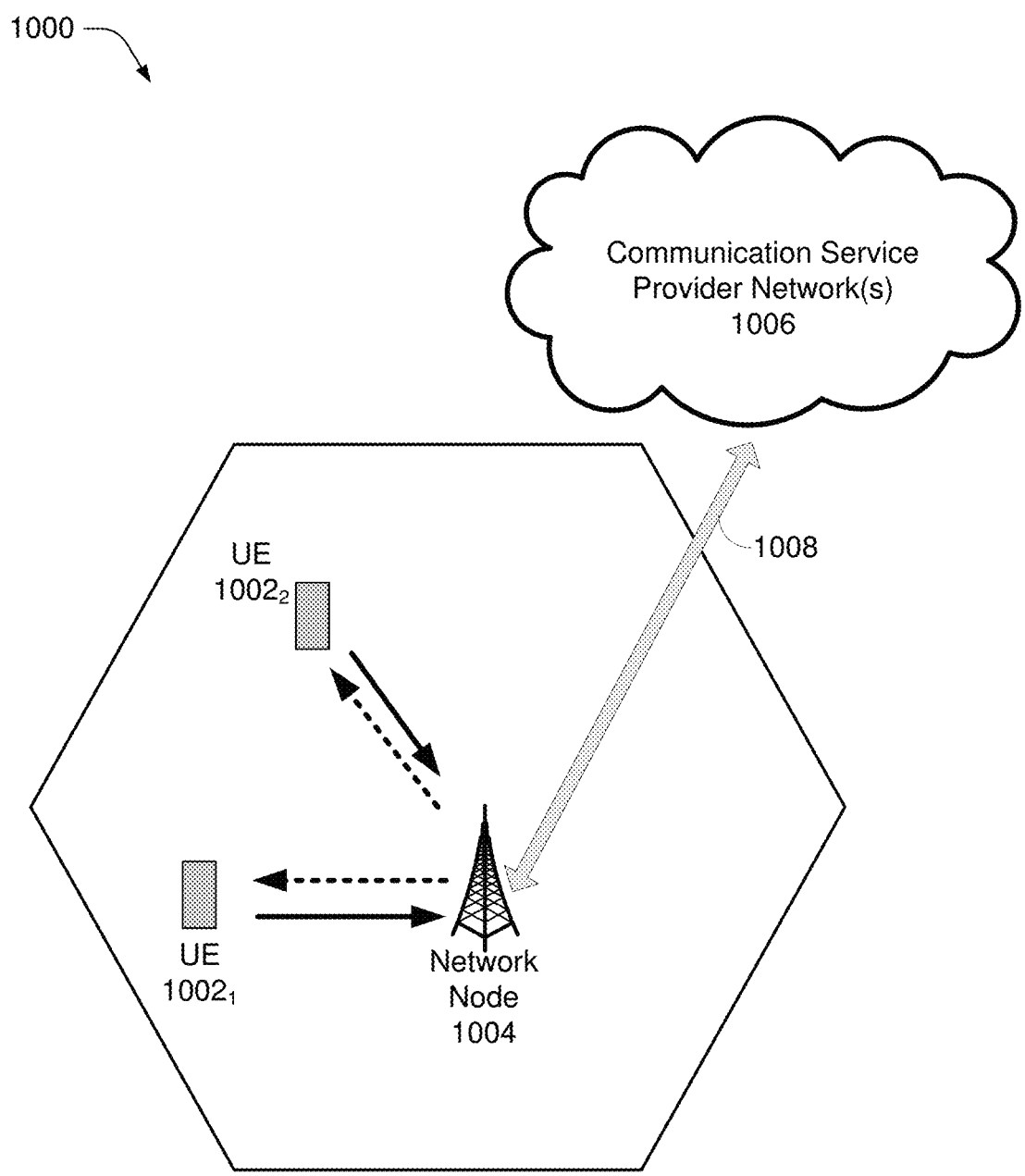
FIG. 10 illustrates a non-limiting example of a wireless communication system, in accordance with various aspects and implementations of the subject disclosure.

FIG. 10 illustrates a non-limiting example of a wireless communication system 1000 in accordance with various aspects and embodiments of the subject disclosure. In one or more embodiments, system 1000 can comprise one or more user equipment UEs 1002. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UEs 1002 can also comprise IOT devices that communicate wirelessly.

In various embodiments, system 1000 is or comprises a wireless communication network serviced by one or more wireless communication network providers. In example embodiments, UEs 1002 can be communicatively coupled to the wireless communication network via a network node 1004. The network node (e.g., network node device) can communicate with user equipment (UE), thus providing connectivity between the UE and the wider cellular network. The UEs 1002 can send transmission type recommendation data to the network node 1004. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, UEs 1002 can send and/or receive communication data via a wireless link to the network node 1004. The dashed arrow lines from the network node 1004 to the UEs 1002 represent downlink (DL) communications and the solid arrow lines from the UEs 1002 to the network node 1004 represents an uplink (UL) communications.

System 1000 can further include one or more communication service provider networks 1006 that facilitate providing wireless communication services to various UEs, including UE 1002, via the network node 1004 and/or various additional network devices (not shown) included in the one or more communication service provider networks 1006. The one or more communication service provider networks 1006 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 1000 can be or include a large scale wireless communication network that spans various geographic areas. According to this implementation, the one or more communication service provider networks 1006 can be or include the wireless communication network and/or various additional devices and components of the wireless communication network (e.g., additional network devices and cell, additional UEs, network server devices, etc.). The network node 1004 can be connected to the one or more communication service provider networks 1006 via one or more backhaul links 1008. For example, the one or more backhaul links 1008 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 1008 can also include wireless link components, such as but not limited to, line-of-sight (LOS) or non-LOS links which can include terrestrial air-interfaces or deep space links (e.g., satellite communication links for navigation).

Wireless communication system 1000 can employ various cellular systems, technologies, and modulation modes to facilitate wireless radio communications between devices (e.g., the UE 1002 and the network node 1004). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 1000 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 1000 are particularly described wherein the devices (e.g., the UEs 1002 and the network device 1004) of system 1000 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 1000 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 11:
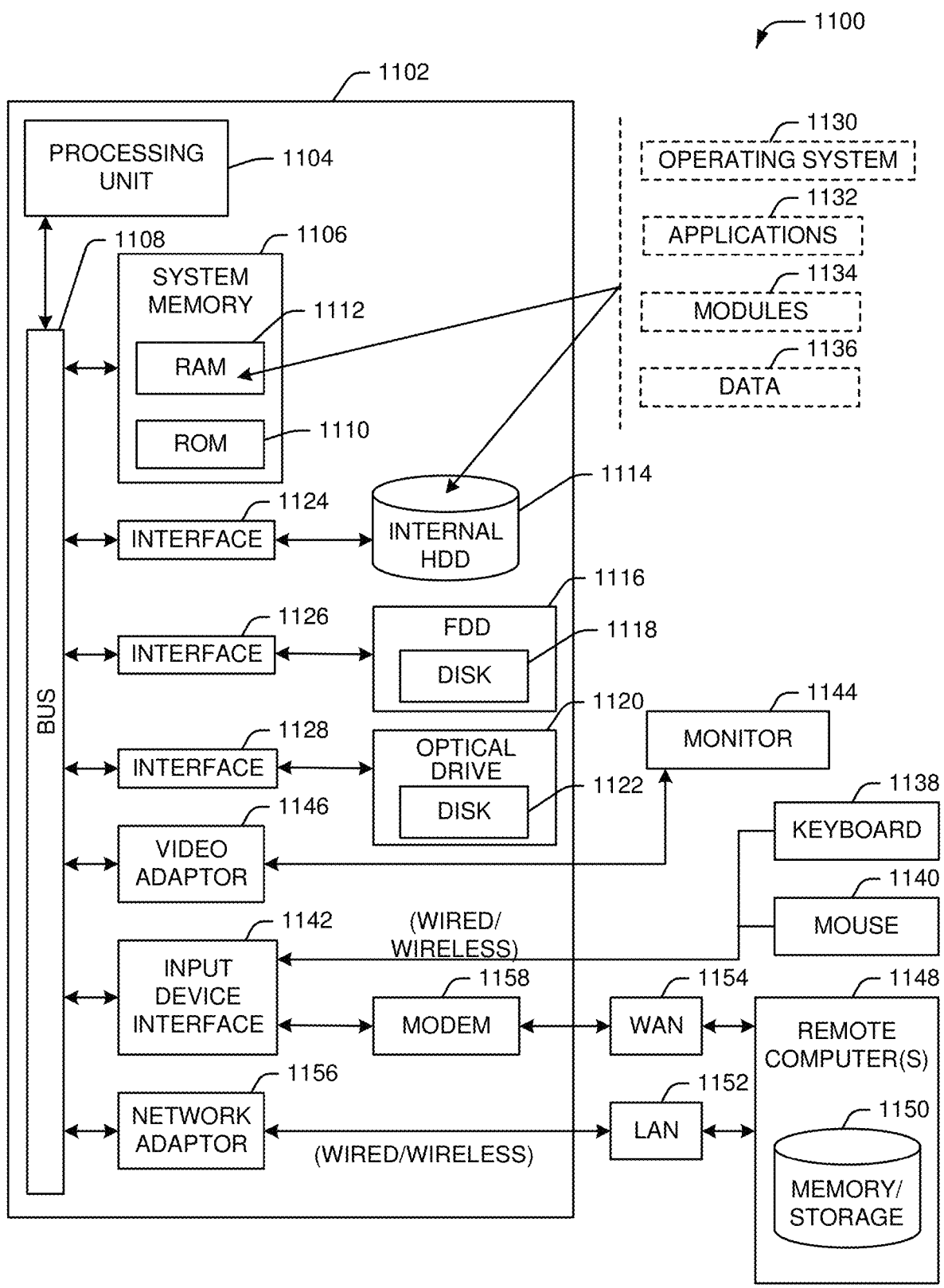
FIG. 11 illustrates a suitable computing environment in which the various aspects of this disclosure can be implemented, in accordance with various aspects and implementations of the subject disclosure.

In order to provide additional context for various embodiments described herein, FIG. 11 and the following discussion are intended to provide a general description of a suitable computing environment 1100 in which the various embodiments of the embodiment described herein can be implemented. The computer 1100 can implement, for example, a device of a ML model design platform 102, a device of a network automation platform 104, or a device of a radio access network 106, such as a radio access network controller.

While the embodiments have been described above in the general context of computer-executable instructions that can run on one or more computers, those skilled in the art will recognize that the embodiments can be also implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). While the internal HDD 1114 is illustrated as located within the computer 1102, the internal HDD 1114 can also be configured for external use in a suitable chassis (not shown). The HDD 1114, magnetic FDD 1116 and optical disk drive 1120 can be connected to the system bus 1108 by an HDD interface 1124, a magnetic disk drive interface 1126 and an optical drive interface 1128, respectively. The interface 1124 for external drive implementations includes at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1194 serial port, a game port, a USB port, an IR interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a system comprising a processor, first data representative of an untrained machine learning model for radio access network equipment;
collecting, by the system, model training data from the radio access network equipment;
training, by the system, the untrained machine learning model with the model training data, to thereby produce second data representative of a trained machine learning model;
deploying, by the system, the second data representative of the trained machine learning model to the radio access network equipment,
wherein the trained machine learning model is usable by the radio access network equipment to analyze radio access network data and make radio access network control decisions based on the radio access network data;
receiving, by the system, performance feedback data representative of performance feedback related to operation of the trained machine learning model at the radio access network equipment; and
using, by the system, the performance feedback data to evaluate a performance of the trained machine learning model and identify an update for the trained machine learning model.

2. The method of claim 1, wherein the first data representative of the untrained machine learning model comprises first published model data representative of a published machine learning model, published by a machine learning model design platform.

3. The method of claim 2, further comprising:
uploading, by the system, the second data representative of the trained machine learning model to the machine learning model design platform; and
in response to the uploading, receiving, by the system, second published model data representative of a published trained machine learning model from the machine learning model design platform.

4. The method of claim 3, wherein deploying the second data representative of the trained machine learning model to the radio access network equipment comprises deploying the second published model data representative of the published trained machine learning model to the radio access network equipment.

5. The method of claim 1, further comprising modifying, by the system, the second data representative of the trained machine learning model by incorporating the update in the trained machine learning model, to thereby produce updated model data representative of an updated machine learning model.

6. The method of claim 5, further comprising training, by the system, the updated model data representative of the updated machine learning model with the model training data.

7. The method of claim 6, further comprising deploying, by the system, the updated model data representative of the updated machine learning model to the radio access network equipment.

8. The method of claim 7, further comprising uploading, by the system, the updated model data representative of the updated machine learning model to a machine learning model design platform, and receiving, in response to uploading the updated model data, published updated model data representative of a published updated machine learning model from the machine learning model design platform, wherein the updated model data representative of the updated machine learning model deployed to the radio access network equipment comprises the published updated model data representative of the published updated machine learning model.

9. The method of claim 1, wherein the trained machine learning model comprises a micro-service.

10. The method of claim 1, wherein the system is included in a network automation platform.

11. The method of claim 10, wherein the training comprises facilitating enablement of a virtualized environment allowing the untrained machine learning model to operate as if the untrained machine learning model was operating as part of a radio access network comprising the radio access network equipment.

12. The method of claim 11, wherein providing the virtualized environment comprises virtualizing a radio access network command interface.

13. The method of claim 1, wherein the training comprises applying a defined number of training cycles.

14. A method, comprising:
sending, by a radio access network controller comprising a processor, model training data for use in training a machine learning model for network equipment used in a radio access network;
receiving, by the radio access network controller, data representative of a trained machine learning model for the radio access network, wherein the trained machine learning model was trained using the model training data;
executing, by the radio access network controller, the trained machine learning model to analyze radio access network data and make a radio access network control decision based on the radio access network data;
sending, by the radio access network controller, performance feedback data representative of performance feedback related to the executing of the trained machine learning model at the radio access network controller; and
receiving, by the radio access network controller, updated model data representative of an updated machine learning model for the network equipment, wherein the updated machine learning model incorporates an update identified from the performance feedback data.

15. The method of claim 14, wherein sending the model training data comprises sending the model training data to network automation platform equipment, and wherein receiving the data representative of the trained model data comprises receiving the data representative of the trained model data from the network automation platform equipment.

16. The method of claim 15, further comprising collecting, by the radio access network controller, the performance feedback data related to the executing of the trained machine learning model at the radio access network controller.

17. The method of claim 14, wherein the trained machine learning model comprises a published trained machine learning model, published by devices of a machine learning model design platform.

18. A radio access network controller, comprising:
a processor; and
a memory that stores executable instructions that, when executed by the processor of a radio access network controller, facilitate performance of operations, the operations comprising:
providing model training data for use in training a machine learning model for devices that are part of a radio access network;
receiving data representing a trained machine learning model for the radio access network, wherein the trained machine learning model has been trained using the model training data;
using the trained machine learning model to analyze radio access network data and to generate, based on the radio access network data, control instructions usable to control the devices;
providing performance feedback data representative of performance feedback related to the execution of the trained machine learning model at the radio access network controller; and
receiving updated model data representing an updated machine learning model for the radio access network, wherein the updated machine learning model comprises an update identified from the performance feedback data.

19. The radio access network controller of claim 18, wherein the operations further comprise collecting the performance feedback data related to the execution of the trained machine learning model at the radio access network controller.

20. The radio access network controller of claim 18, wherein the trained machine learning model comprises a published trained machine learning model, published by a machine learning model design platform.

* * * * *